March 15, 1966  W. A. WILLIAMSON  3,240,285
POWER STEERING SYSTEM
Filed Aug. 16, 1962  3 Sheets-Sheet 1

INVENTOR
WILLIAM A. WILLIAMSON
BY
ATTORNEY

March 15, 1966  W. A. WILLIAMSON  3,240,285
POWER STEERING SYSTEM
Filed Aug. 16, 1962  3 Sheets-Sheet 2

INVENTOR
WILLIAM A. WILLIAMSON
BY J. C. Wiessler
ATTORNEY

March 15, 1966  W. A. WILLIAMSON  3,240,285
POWER STEERING SYSTEM
Filed Aug. 16, 1962  3 Sheets-Sheet 3

INVENTOR
WILLIAM A. WILLIAMSON
BY  J. C. Wiessler
ATTORNEY

United States Patent Office 3,240,285
Patented Mar. 15, 1966

3,240,285
POWER STEERING SYSTEM
William A. Williamson, Battle Creek, Mich., assignor to Clark Equipment Company, a corporation of Michigan
Filed Aug. 16, 1962, Ser. No. 217,445
16 Claims. (Cl. 180—79.2)

This invention relates to power steering mechanisms for vehicles, and more particularly to a power steering mechanism which inherently provides differential steering angles between the steering wheels and also provides for automatic alignment of the wheels by the operator by means of the mechanism.

My invention provides a significant improvement in power steering mechanisms in the implementation of relatively simple hydraulic circuitry so arranged in the steering system as to provide automatically for required differential steering angles between the steering wheels merely by proper utilization and design of power steering cylinders which are connected to the steering arms of the wheels, and which in the use of relatively simple valving means is capable of realigning the wheels whenever that is required merely by actuating the power cylinders in a prescribed manner.

It is therefore a primary object of my invention to provide an improved power steering mechanism which is capable of automatically realigning the steering wheels whenever that is required.

Another primary object of the invention is to provide a power steering mechanism in which a relatively simple structure is provided for producing required differential steering angles between the steering wheels.

Another object of the present invention is to provide a power steering system of relatively simple and economical construction.

A further object of the invention is to provide a combination of control valve means and power steer cylinders in a power steering system which are so constructed and arranged as to induce differential steering of the steer wheels during operation while being also capable of providing for realignment of the wheels whenever that is required.

In carrying out my invention in a preferred form I provide a vehicle steering mechanism which has a pair of piston and cylinder actuators connected between the frame of the vehicle and wheel pivot means and disposed on opposite sides of the axis of roation of the wheels and interconnected such that the head end of one communicates with the rod end of the other and vice versa. Hydraulic pump and valving means are provided in the system for controlling at the operator's will the degree and direction of steering movement of the wheels while also providing for actuation of the wheels by the cylinder actuators to a position of alignment following misalignment thereof for any reason.

Other objects, features and advantages of the present invention will become apparent from the following description taken in conjunction with the accompanying drawings wherein.

Referring now in detail to the drawings, the rear portions of a pair of transversely spaced, longitudinal vehicular frame members are indicated at numerals 10; they are held in spaced relation by transverse frame members, not shown, are adapted to support a vehicular body and are in turn supported by a plurality of wheel assemblies, two of which are illustrated at numerals 12 and 14. As shown, wheel assemblies 12 and 14 comprise rear steering-driving wheels, but may, if desired, be non-traction steer wheels.

Figures 2, 5:
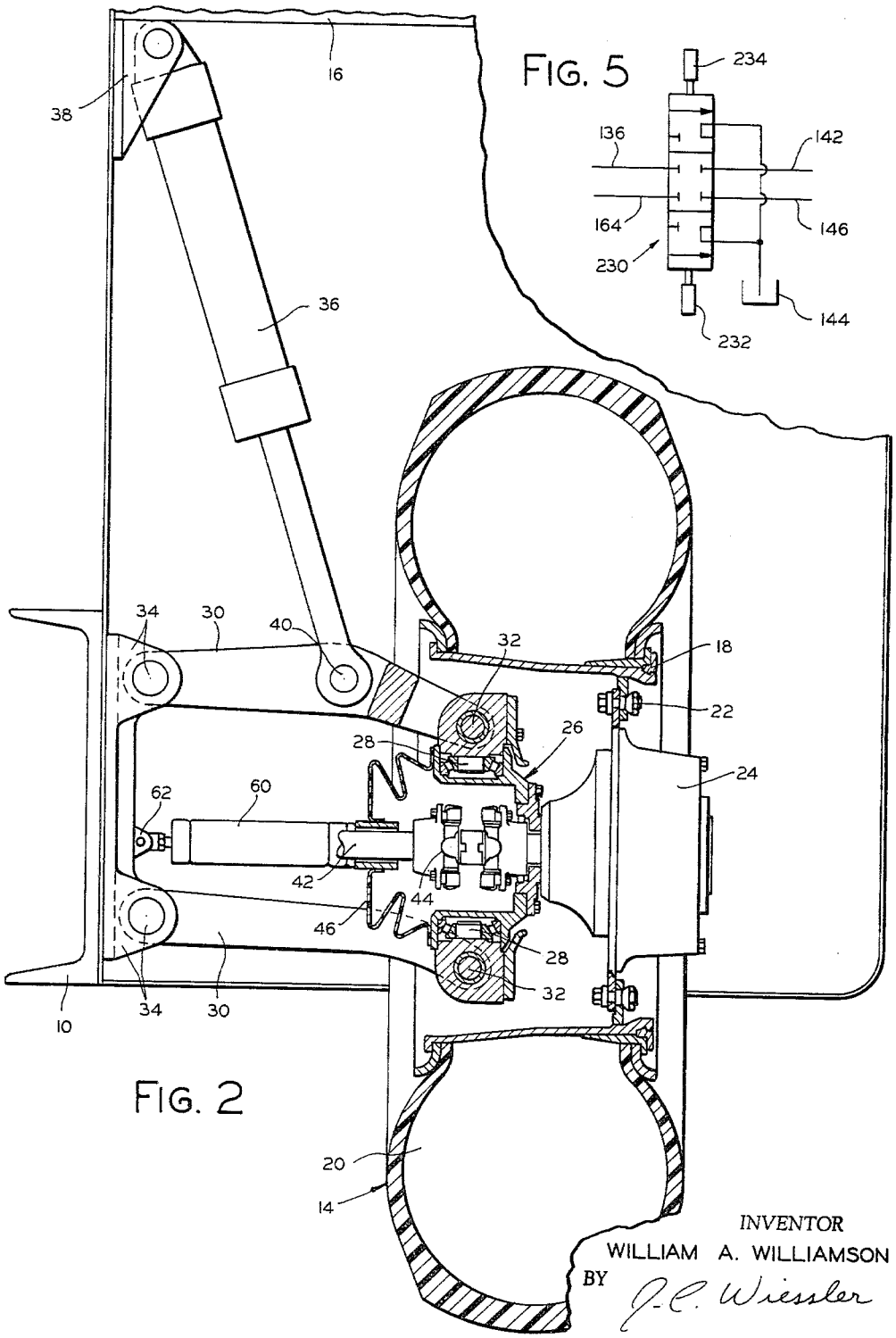
FIGURE 2 is a partial sectional view taken from the rear end of one side of the mechanism shown in FIGURE 1.
FIGURE 5 is a schematic view of a modified form of one of the control valves in the system shown in FIGURE 1.
Figure 3:
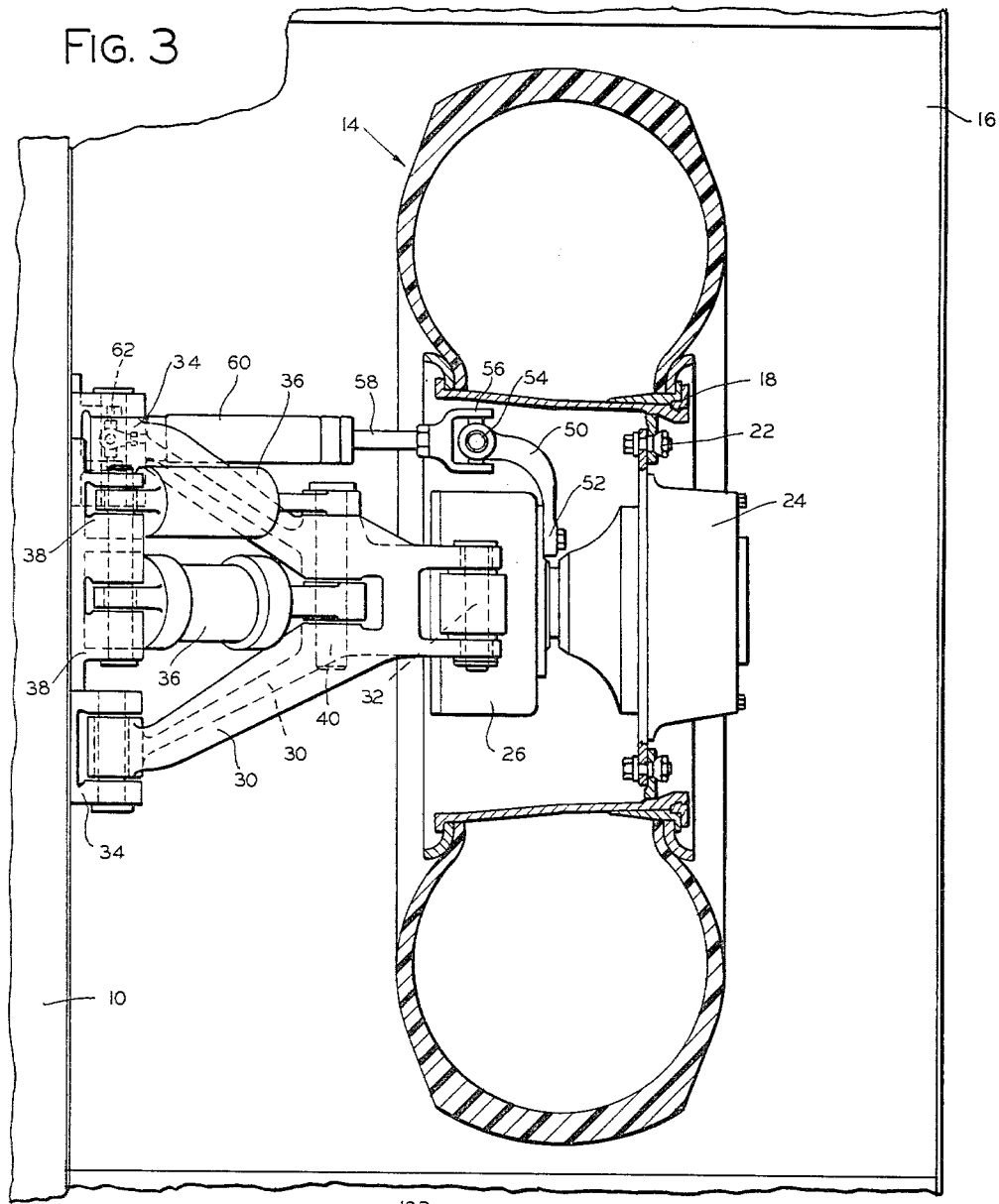
FIGURE 3 is a plan view of the wheel suspension and actuating mechanism shown in FIGURE 2.

The manner of mounting the wheels is best illustrated in FIGS. 2 and 3 wherein wheel 14 is shown within a wheel well 16 which is supported from the one frame member 10. Each wheel assembly comprises a driven rotatable rim 18, upon which is mounted a tire 20, which is mounted in driving connection by a ring of bolts 22 with a planetary gear drive axle end 24. Axle end 24 is suitably connected to a drive assembly 26 mounted for dirigible movement with wheel 14 in a king pin assembly 28 which supports the wheel assembly from a pair of vertically spaced forked suspension arms 30 pivotally connected at 32 to the king pin 28 and pivotally connected to frame member 10 from bifurcated brackets and pins 34. A pair of diagonally extending wheel suspension hydraulic cylinder and piston assemblies 36 are connected at the upper ends to bifurcated bracket and pin assemblies 38 and at the lower ends to intermediate portions of upper arms 30 by a pin 40. A portion of the drive axle is shown at numeral 42; it drives the wheel through axle end 24 by way of a universal joint 44. A flexible grease seal means is shown in numeral 46. The construction as described thus far is essentially conventional and need not be described in greater detail. Likewise, the power train connections from an engine to drive axle ends 42 by way of a power transmission and differential axle mechanism are conventional and have not been illustrated.

A steering arm 50 is secured at 52 to assembly 26 and extends forwardly and then inwardly thereof to its opposite end 54 which is pivotally connected to a bifurcated bracket 56 which is secured to the end of a piston rod 58 of a power steering cylinder actuator motor 60, the latter being secured pivotally at its base end to frame member 10 by a bifurcated bracket and pin assembly 62. Each bracket assembly 62 is connected to an extension 64 which is secured to the base end of each cylinder 60 such that the cylinder can pivot in a horizontal plane on a vertical pin 66; the latter is secured to a sleeve 68 on longitudinally extending pin 70 of bracket 62 so that the cylinder 60 and extension 64 are also pivotable in a vertical plane about pin 70. Likewise, bracket and pin assembly 54, 56 mounts the end of piston rod 58 to steering arm 50 so that rod 58 is pivotable both horizontally and vertically of steering arm 50, thus providing for extension and retraction of piston rod 58 for turning wheel 14 to either a right or left turn angle without producing undesirable stress in the parts comprising the steering actuator assembly.

Wheel assembly 12 is supported from left hand frame member 10 in the same manner as is wheel assembly 14 supported from right hand frame member 10, the suspension and driving assemblies being duplicated in association with wheel 12. Likewise, a steering piston and cylinder actuator assembly 72, 74 duplicates actuator assembly 58, 60 and is supported for pivotal movement in two planes from left hand frame member 10 by a pin and bracket assembly 76, similar to bracket assembly 62, and to a steering arm 78 by a pin and bracket assembly 80, similar to assembly 54, 56. The effective lengths of cylinders 60 and 74, as well as of rods 58 and 72, are the same, and suitable adjustments for varying the effective travel of the piston rods may be used in practice to compensate for manufacturing tolerances, and the like, so that the length of the strokes of rods 58 and 72 may be made equal. An important difference in the mounting of cylinder assemblies 60 and 74 will be noted in that steering arm 78 extends rearwardly and then inwardly relative to the axis of wheel 12, at which position cylinder assembly 72, 74 is mounted transversely of the vehicle and rearwardly of the axis of rotation of wheel 12, whereas cylinder assembly 58, 60 and steering arm 50 are located transversely of the vehicle an equal distance forwardly of the axis of rotation of wheel 14.

The hydraulic supply and control system for operating actuators 60 and 74 will now be described. A three-way manually operated control valve, shown diagrammatically at numeral 90, is adapted to be located in the operator's compartment and is connected by a conduit 92 to a pressurizing pump 94 and to a sump 96 by conduit 98. Valve 90 is shown in the non-operating position wherein neither of outlet ports 100 or 102 is in communication with inlet port 104. A handle 106, which in practice may be a steering wheel or tiller, is adapted to actuate the valve in either direction from the illustrated position such that rearward actuation connects conduit 92 to a conduit 108 by way of a valve passage 110, and actuation in a forward direction connects conduit 92 to a conduit 112 by way of a valve passage 114. With the valve actuated rearwardly a closed port 116 blocks conduit 112, and when actuated forwardly a closed port 118 blocks conduit 108. Conduit 108 is connected to the rod end of cylinder 74 and conduit 112 is connected to the head end thereof, said conduits being adapted to be connected under certain operating conditions to sumps 120 and 122, respectively, by way of branch conduits 124 and 126, pilot operated check valves 128 and 130, passages 131 and 133, and relief valves 132 and 134, respectively. The head end of cylinder 74 is adapted to be connected under certain selected conditions to the rod end of cylinder 60 by way of a conduit 136, a passageway 138 of a solenoid operated valve 140, and a conduit 142. When cylinder 74 is thus connected hydraulically to cylinder 60, the head end of cylinder 60 is connected to sump 144 by way of a conduit 146, a passageway 148 in valve 140 and a drain passage 150.

Solenoid operated valve 140 is normally urged by a spring 152 to the illustrated position, but when energized by means of a solenoid actuator 154, a battery 156, the closure of a normally open switch 158, and lead lines 160 and 162, valve 140 is actuated forwardly to communicate the rod end of cylinder 74 with the head end of cylinder 60 by way of a conduit 164, a valve passageway 166 and the conduit 146, and to communicate the rod end of cylinder 60 with sump 144 by way of conduit 142, a valve cross-over passage 170 and drain passage 150. A pilot passageway 172 connects conduit 142 downstream of valve 140 to a pilot port in valve 130, and a branch passage 174 similarly connects conduit 146 to a pilot port in valve 128. Battery 156 is also adapted to energize a motor 171, which is drivably connected to pump 94, by way of the connections from the battery terminals to motor terminals, as shown. A switch 173 is shown as manually operated for energizing the motor and pump upon actuation of valve 90 to either operative position thereof, although switch 173 in practice is preferably coordinated with actuation of valve 90 so that pump 94 is energized and de-energized automatically as required with operation of valve 90.

Figure 4:
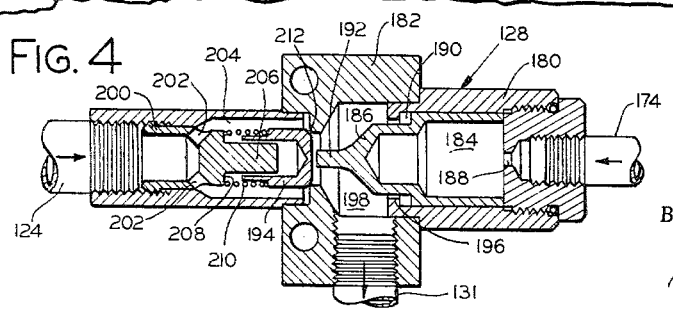
FIGURE 4 is a detailed sectional view of certain valve mechanism shown schematically in FIGURE 1.

Pilot operated valves 128 and 130 are of the same construction, valve 128 being shown in detail in FIG. 4. The valve comprises a housing 180 secured to a mounting block 182 and having a pilot chamber 184 within a reciprocable pilot valve 186 in communication through a pilot port 188 with conduit 174. The pilot valve 186 comprises generally a hollow piston valve which is reciprocable in a chamber 190 and which has an extension 192 at the inner end thereof adapted to contact and unseat a check valve 194 upon communication through pilot port 188 with relatively high pressure fluid in conduit 174. An annular shoulder 196 limits the movement of pilot valve 186 in chamber 190 and provides an annular passageway around valve 186 which communicates leakage into chamber 190 with a drain chamber 198 and sump 120 by way of passage 131 and relief valve 132. A spring retainer insert 200 is threadedly secured in an adjusted position within the open end of valve 128 in communication with branch passage 124 and includes ports 202 in the wall thereof in communication with check valve chamber 204. The inner end of member 200 comprises a projection 206 for guiding axial movement of check valve 194, and a shoulder 208 which supports one end of a spring 210 for urging valve 194 to a closed position in a valve seat 212. Chamber 198 is always filled with fluid, and so long as relief valve 132 remains closed, pilot valve 186 remains substantially in the position shown, as does check valve 194 under the influence of spring 210 whether or not high pressure fluid is received in chamber 204 by way of passage 124. However, under certain conditions sufficient fluid pressure may be generated in passage 174 such that the pressure in chamber 184 rises sufficiently to cause check valve 132 to open thereby venting chamber 198 to sump 120 through passage 131 and permitting pilot valve 186 to actuate check valve 194 to an open position against spring 210 to communicate branch passageway 124 with sump 120 by way of chambers 204 and 198, passage 131 and relief valve 132. The purpose of pilot operated check valves 128 and 130 in my power steering system will be better understood as the description proceeds.

A vehicle which embodies my power steering system will operate as follows: It will be remembered that wheels 12 and 14 as associated with the steering mechanism disclosed operate as rear steer wheels, although it will be appreciated that with slight modification the system is equally applicable to front and center steer wheels in a multi-wheeled vehicle.

With the wheels positioned as illustrated for straight-ahead movement of the vehicle, all elements of my power steering system are located as illustrated, the actuator cylinders 60 and 74 being in a locked condition with control valve 90 blocking communication of conduits 108 and 112 with the pressure source, operator handle 106 being located in the solid line position, switches 158 and 173 being open, and valve 140 being de-energized in which condition conduit 136 is connected to conduit 142 through valve passage 138 while conduit 146 is connected to sump 144. It will be appreciated that although sumps 96, 120, 122 and 144 have been separately described and numbered for the purpose of clarity of illustration, these sumps will, in practice, normally be combined in a single sump.

If the operator desires to steer to the right valve 90 is actuated rearwardly wherein handle 106 is located in its rearward dotted position, valve passage 110 connects conduit 92 to conduit 108 and valve port 116 closes conduit 112. Simultaneously with actuation of valve 90 switch 173 is closed to energize motor 171 and pump 94 to generate a flow of pressure fluid in conduit 108 which flows into the rod end of cylinder 74 and actuates rod 72 to the right causing steering arm 78 to steer wheel 12 in a counterclockwise direction about king pin 28. Pressure fluid in conduit 108 cannot flow through branch passage 124 which is blocked by check valve 194 in valve 128, nor is there any flow through conduit 164 which is blocked at valve 140. Rightward movement of rod 72 forces pressure fluid from the head end of cylinder 74 to the rod end of cylinder 60 by way of conduits 136 and 142 and valve passage 138, thereby producing leftward movement of rod 58 to actuate wheel 14 in a counterclockwise direction about its king pin mounting. Leftward movement of rod 58 to any given selected new steering position of wheel 14 causes the displaced fluid in the head end of cylinder 60 to flow to sump 144 by way of conduit 146, valve passage 148 and drain line 150. It will be appreciated that no flow occurs in either of pilot lines 172 or 174 since insufficient pressure is generated during steering movement to actuate pilot valve 186 of valves 128 and 130. Cylinders 60 and 74 therefore function in a closed steering circuit in which pressure fluid flowing in conduit 108 actuates wheel 12 to a selected steering position while the volume of fluid exhausted from the head end of cylinder 74 is received in the rod end of cylinder 60 for coordinating steering movement of wheel 14 with that of wheel 12. Cylinders 60 and 74 are therefore in a slave and master relationship continuously during operation of the steering system.

Figure 1:
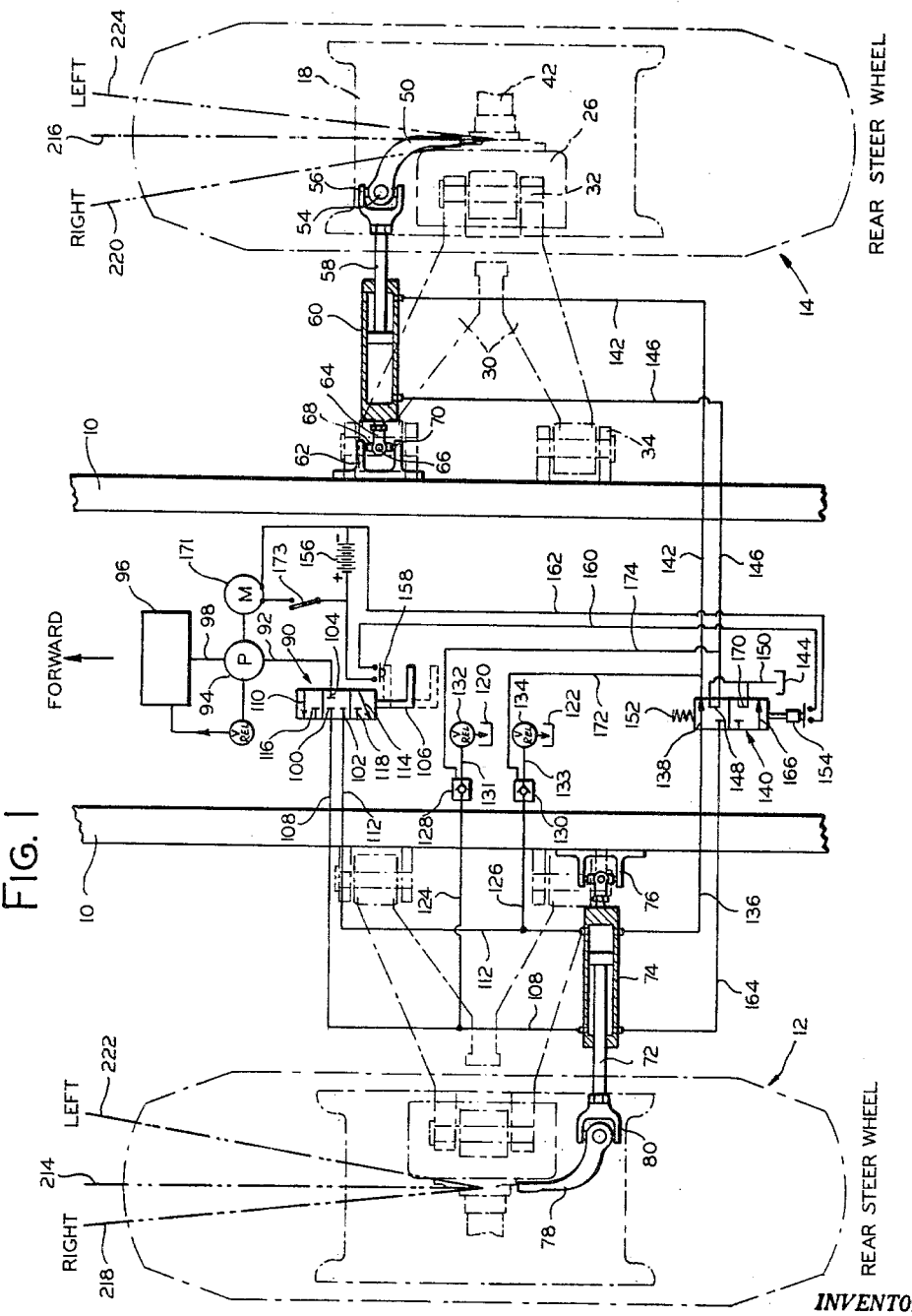
FIGURE 1 is a somewhat diagrammatic showing in plan view of my invention as applied to the rear steering-driving wheels of a vehicle.

The oppositely disposed relationship of cylinders 60 and 74 relative to the axis of rotation of wheels 12 and 14 and the design relationship between the cylinders and pistons combined with the communication of the head end of cylinder 60 with the rod end of cylinder 74 effects differential steering angles between wheels 12 and 14 as illustrated schematically in FIG. 1 by the differential angles represented between neutral wheel axes 214 and 216 and the right-hand steer axes 218 and 220, and between said neutral axes and left-hand steer axes 222 and 224. For example, if the rod end of cylinder 74 receives a volume of pressure fluid sufficient to actuate wheel 12 to the right-hand steer position represented by wheel axis 218, a greater volume of fluid is displaced from the head end of the cylinder by an amount equal to the volume displacement of that portion of pistons rod 72 which moves into cylinder 74 during movement of wheel 12. Since this greater fluid volume is directed to the rod end of cylinder 60, piston rod 58 is actuated a proportionately greater distance inwardly of cylinder 60 and thereby actuates wheel 14 to a right-hand steering angle which is greater than the steering angle of wheel 12 by an amount proportional to the difference between the fluid volume received in the rod end of cylinder 74 and the fluid volume displaced from the head end thereof. The difference in steering angles illustrated in FIG. 1 have been somewhat exaggerated for the purpose of illustration.

To effect steering in an opposite direction, control valve 90 is actuated forwardly to a position wherein valve passage 114 connects conduits 92 and 112 and handle 106 closes switch 158 to energize solenoid 154 which actuates valve 140 forwardly so that valve passage 166 connects conduits 164 and 146 and valve passage 170 connects conduit 142 to the sump by way of drain passage 150, while conduit 136 is closed by the rearward closed port in valve 140 and conduit 108 is closed at port 118 of valve 90. Pressure fluid then flows from pump 94 to the head end of cylinder 74 by way of conduit 112 and no flow can occur through conduit 126 or 136 in this condition. The head end of cylinder 74 therefore receives the total volume of fluid flowing in conduit 112 and actuates wheel 12 in a clockwise direction to the assumed steering angle indicated by axis 222. During such movement of piston 72 fluid is displaced from the rod end of cylinder 74 into conduit 164 and thence to the head end of cylinder 60 through valve passage 166 and conduit 146. In this instance the reverse of the above-described right-hand steering mode occurs in that a smaller volume of fluid is exhausted from the rod end of cylinder 74 than is received in the head end thereof and it is this smaller volume which is received in the head end of cylinder 60, whereby wheel 14 is actuated to a left-hand steering angle which is smaller than the steering angle of wheel 12 by an amount proportional to the difference between the fluid volume received in the head end of cylinder 74 and the fluid volume exhausted from the rod end thereof.

It will be noted that with the steer wheels in a straight-ahead position the relative axial positions of the pistons in cylinders 60 and 74 differ, i.e., the piston head in cylinder 60 is located substantially closer to the rod end of the cylinder than is the piston head of cylinder 74, and, of course, because of the location of the cylinders on opposite sides of the axis of the wheels the piston rods are actuated in opposite directions in a right and left-hand sense during steering movement in either direction of the wheels 12 and 14. The design in this respect is such that movement of the pistons to an extreme position at either end of the respective cylinders to cause wheels 12 and 14 to move to either an extreme right or left-hand steering position produces ideal differential steering angle between the wheels. Maximum steering angle is of course, limited by the length of cylinders 60 and 74, and the maximum ideal differential steering angle is inherently produced when both pistons are actuated to the extreme left or the extreme right ends of the respective cylinders. The flexibility of design criteria in producing power steering mechanisms in accordance with the present invention for any given desired steering angle and steering angle differential in different applications hereof will be apparent. For example, in vehicles having three pairs of longitudinally spaced steer wheels, one pair forward, one pair rear, and one center pair, the requirements of the differential steer angle as between the wheels of one pair are different than as between the wheels of each of the other pairs. Such a result can be readily provided in the steering system of my invention by, for example, varying the design of the pair of cylinders associated with each pair of wheels and the diameter of the associated pair of piston rods so as to produce the required variable differential steering angle as between the different pairs of wheels.

Returning to the foregoing example of left-hand steering angles as indicated at wheel axes 222 and 224, it will be understood that, as illustrated, in order to fix the steering angle of each wheel at this intermediate position valve 90 is actuated to its neutral illustrated position when the exemplary steering angle of each wheel is reached. This also effects a de-energization of solenoid valve 140 which thereupon returns to the position illustrated. Pistons 58 and 72 will remain in the exemplary left-hand steer position for so long as valve 90 is retained in its neutral position. In this condition there will be no flow of fluid from the head end of cylinder 74 to the rod end of cylinder 60 even though conduits 136 and 142 are in communication because the rod end of cylinder 74 is now in a closed circuit and any tendency of the piston in cylinder 74 to float to the right or to the left is blocked.

Concerning the simplified schematic showing of my control system, and especially of valve 90, it will be appreciated that in practice follow-up servo connections may be provided if desired between valve 90 and the wheels or pistons so that follow-up steering is present. That is, so that the operator's wheel or tiller movement and position is indicative of the steering angle in either direction. Steering follow-up servo mechanisms are well known in the art, and may be readily provided in my steering system.

In some circumstances there may be leakage of fluid between opposite sides of the piston in cylinder 74, and, if desired, a more positive lock-up at any given steer position of the cylinders may be provided by a modified three position solenoid actuated valve 230 as illustrated in FIG. 5. A valve of the type shown schematically at 230 may be substituted directly in the circuitry for valve 140. Valve 230 is a double-acting solenoid operated valve which is actuated by solenoid 232 to a forward position the same as is valve 140 actuated by solenoid 154 when control handle 106 is actuated to close switch 158. A second solenoid 234 is connected to the opposite end of the valve and is energized by a second switch which connects battery 156 to solenoid 234 when control handle 106 is actuated rearwardly to actuate the valve to a rearward position, the same as the normal position of valve 140 as shown in FIG. 1. When both solenoids are deenergized, as when control handle 106 is in the solid line position, the valve 230 assumes the neutral position illustrated wherein all conduits which interconnect cylinder assemblies 60 and 74 are closed.

Following extended operation of a vehicle which embodies my invention the steer wheels may become misaligned as a result, for example, of seepage of fluid from one side of either or both of cylinders 60 and 74 to the other sides thereof. Pilot operated valves 128 and 130 in combination with the relief valves 132 and 134 provide, in combination with the remainder of the steering system, means for automatically realigning the wheels. For instance, assume that the wheels become misaligned so that when wheel 12 is in a straight-ahead position wheel 14 is misaligned toward a right turn position. Such misalignment can be corrected by the operator by actuating both wheels to a full right turn position wherein the piston rods are fully collapsed within the cylinders. To realign the wheels the following action is taken: Valve 90 is actuated rearwardly to connect the rod end of cylinder 74 with the pump, valve 140 during this operation remaining in its illustrated position. As piston rod 72 moves rightwardly the rod end of cyilnder 60 receives fluid from cylinder 74 which actuates rod 58 leftwardly. However, since it is assumed that wheel 14 is misaligned toward a right turn position, the piston of cylinder 60 will move into abutment with the left end of the cylinder prior to abutment of the other piston with the right end of cylinder 74. At this point wheel 14 has reached a full right turn position but wheel 12 has not. Continued flow of pressure fluid into the rod end of cylinder 74 increases the pressure in the head end thereof until the generated pressure in branch pilot passage 172 causes the pilot valve 186 in valve 130 to be actuated to the left which opens check valve 194 and permits the pressure fluid in the head end of cylinder 74 to flow to sump 122 by way of conduit 126, the now open check valve in valve 130, passage 133 and relief valve 134. The remaining volume of fluid in the head end of cylinder 74 will therefore be forced from the cylinder upon continued rightward movement of the piston to a fully collapsed position at which the wheels 12 and 14 are again in proper alignment, whereupon the consequent reduction in pressure in passage 172 allows pilot valve 186 to move rightwardly and permits check valves 194 to close in seat 212.

It will be appreciated that under the assumed condition, both pilot valve 186 and check valve 194 are subjected to the same fluid differential pressure, inasmuch as relief valve pressure in chamber 198 is common to the one sides of both valves and the pressure in both chambers 184 and 204 is derived from the head end of cylinder 74. Inasmuch as the effective area of pilot valve 186 is substantially larger than that of check valve 194, valve 186 will move to the left against relief pressure in chamber 198 and open check valve 194 against spring 210.

Assuming now that wheel 12 is straight and wheel 14 is misaligned toward a left turn position, the wheels may be realigned as follows: Control valve 90 is actuated forwardly to a left turn position which actuates valve 140 forwardly as above-described and causes both of rods 58 and 72 to be actuated toward fully extended positions. In this example, since rod 58 will reach a fully extended position prior to rod 72, further movement of rod 72 to its fully extended position is provided for by pilot valve 128, the pilot chamber 184 of which communicates with the rod end of cylinder 74 by way of conduit 164, valve passage 166 and pilot passage 174. The same operation then takes place with respect to valve 128 as described above with respect to valve 130, whereby rod 72 is fully extended and the wheels are realigned. Thus, regardless of the degree of misalignment of either wheel relative to the other wheel, the operator is able to automatically realign the wheels merely by turning the wheels either to an extreme left turn or right turn position.

Thus, my invention provides a relatively simple means for controlled full power steering with differential angle steering provided as an inherent part of the construction of the powered wheel motor actuators, while also providing a relatively simple means in the system for effecting realignment of the wheels by merely turning the wheels to a maximum right or left steer position. Inherent in the invention is a desirable flexibility of application which permits any desired rate and differential angle between steering wheels to be effected during operation by making relatively simple changes in the design criteria used in the steering actuator cylinders.

Although only one complete embodiment of my invention has been schematically illustrated and described, it will be apparent to those skilled in the art that many changes and modifications in the structure and arrangement of parts and the like may be made without departing from the scope or spirit of the invention which is defined and comprehended solely by the appended claims which should be construed as broadly as the prior art will permit.

I claim:

1. In a vehicle having a chassis including a pair of transversely spaced steering wheels and transverse axle means supported from said wheels, a power steering mechanism comprising a pair of power actuated motors connected between fixed positions on the chassis and respective ones of the wheels for steering the wheels, one of said motors being spaced forwardly of the axis of rotation of the one wheel, and the other of said motors being spaced rearwardly of the axis of rotation of the other wheel, said motors being connected to each other in a master-slave relationship.

2. In a vehicle having a pair of transversely spaced steering wheels and transverse axle means supporting said wheels, a power steering mechanism comprising a first cylinder-piston assembly connected to one of said wheels on one side of the axle means, and a second cylinder-piston assembly conneced to the other of said wheels on the opposite side of said axle means, the piston of said first assembly being disposed in a first location axially of the first cylinder and the piston of said second assembly being disposed in a second and different relative location axially of the second cylinder when the wheels are in a straight-ahead or non-steering position, said first and second cylinder-piston assemblies being connected to each other in master-slave relationship.

3. A power steering mechanism as claimed in claim 2 wherein a first steering arm extends rearwardly of one of the wheels and is connected to the first cylinder-piston assembly and a second steering arm extends forwardly of the other wheel and is connected to the second cylinder-piston assembly.

4. Differential steering mechanism for vehicles having a pair of laterally spaced steering wheels comprising oppositely extending steering arms connected to opposite ones of said wheels, oppositely extending longitudinally and transversely spaced first and second fluid actuated cylinder-piston assemblies connected to said first and second steering arms, said first and second cylinder-piston assemblies being fluid interconnected head end to rod end and rod end to head end, respectively in a master-slave relationship that extension of the first assembly causes a different extension of the second assembly for producing different steering angles between the pair of wheels.

5. A power steering mechanism as claimed in claim 4 wherein valve means is adapted to direct pressure fluid to a selected end of the first cylinder-piston assembly which, upon steering movement thereof, directs pressure fluid to the second such assembly, and wheel alignment means connected to at least one of said cylinder-piston assemblies for permitting the latter to be actuated to an extreme position of travel.

6. Differential steering apparatus for vehicles comprising a pair of laterally spaced steering wheels, a pair of laterally and longitudinally spaced cylinder-piston motor actuators connected to said pair of wheels on opposite sides of the axis of rotation thereof, said cylinder-piston assemblies being constructed and arranged for operating in coordination with each other to produce differential steering angles as between said steering wheels, and fluid pressure generating and directional control means directly connected to one only of said cylinder-piston assemblies for effecting operation of both said cylinder-piston assemblies, said cylinder-piston assemblies being connected to each other in a master-slave relationship.

7. Steering mechanism as claimed in claim 6 wherein means is connected to one end of one of said cylinder-piston actuators for permitting the piston thereof to be actuated to an extreme position at one end of the corresponding cylinder irrespective of prior actuation of the other piston to an extreme position in its cylinder.

8. Vehicular differential power steering mechanism comprising a pair of laterally spaced steering wheels, a pair of extensible hydraulic cylinder-piston assemblies each having a rod end and a head end, said cylinder-piston assemblies being connected to said steering wheels on opposite sides of the axis of rotation thereof, first conduit means connecting the head end of one cylinder to the rod end of the other cylinder, second conduit means connecting the rod end of said one cylinder to the head end of the other cylinder, and hydraulic pump and valve means communicating pressure fluid directly to either the head end or the rod end of one only of said cylinder-piston assemblies.

9. Steering mechanism as claimed in claim 8 wherein valve means is connected to at least one of said conduit means for venting a volume of fluid from one end of one of said cylinders in the event the piston in said one cylinder has been actuated to less than an extreme position therein following actuation of the other piston to an extreme position in the other cylinder.

10. Steering mechanism as claimed in claim 8 wherein with the wheels in a straight-ahead position the piston of one cylinder is retracted a greater distance than the piston of the other cylinder, the difference in the amount of retraction of said pistons being substantially proportional to the maxium difference in the steering angles between said wheels upon maximum extension or retraction of said pistons, and wherein the difference in the steering angles of said wheels is proportional to the difference in fluid volume between the head and rod ends of said cylinders.

11. A steering system for vehicles comprising a pair of laterally spaced steering wheels, a fluid pressure actuated master cylinder-piston assembly connected on one side of the axis of rotation of one of said wheels for actuating the same in steering movement, a fluid pressure actuated slave cylinder-piston assembly connected to the other wheel on the opposite side of the axis of rotation thereof, fluid pressure connections between the opposite ends of the master and slave cylinders, fluid pressure supply means connected to the master cylinder for actuating the piston thereof in either direction to produce right and left-hand steering movement of the wheel connected thereto, the other wheel being actuated simultaneously in right or left-hand steering movement by the slave assembly and with a steering angle different from the steering angle of the first wheel by virtue of the connections of opposite ends of said cylinders.

12. Steering mechanism as claimed in claim 11 wherein with the steering wheels in a straight-ahead position the pistons of said master and slave assemblies are located in different relative axial positions relative to the ends of said cylinders such that an extreme angle of steering and of the differential angle between said steering wheels is produced when both said pistons are actuated to an extreme operating position in the respective cylinders.

13. Steering mechanism as claimed in claim 11 wherein valve means is operatively connected to at least one end of the master cylinder for effecting realignment of the steering wheels following misalignment thereof, said valve means being adapted to by-pass from said master cylinder a volume of fluid which is proportional to a distance of travel of one piston to an extreme steering position following movement of the other piston to a corresponding extreme steering position.

14. Power steering mechanism comprising a pair of transversely spaced steering wheels, and a pair of fluid pressure actuated cylinder-piston assemblies which are connected to each other in a master-slave relationship and which are connected to opposite ones of said steering wheels for actuating the latter in steering movement, the pistons of said actuators being located in substantially different positions axially of the respective cylinders when the wheels are in a straight-ahead position.

15. A steering mechanism as claimed in claim 14 wherein oppositely disposed ends of said cylinder-piston actuators are fluid pressure connected, and fluid pressure generating means directly connected to one only of said cylinder-piston assemblies, said cylinder-piston assemblies being arranged relative to each other and to said steering wheels such that actuation of one thereof effects actuation of the other thereof in the same direction of steering movement until at maximum steering angles of said steering wheels the pistons are located at positions of maximum travel in the respective cylinders.

16. In a vehicle having a chassis including a pair of transeversely spaced steering wheels and transverse axle means supported from said wheels, a power steering mechanism comprising a first steering arm connected to one of the wheels extending forwardly of the axle means, a second steering arm connected to the other wheel extending rearwardly of the axle means, first and second double-acting cylinder-piston and rod assemblies connected to the chassis at fixed locations and to said first and second steering arms, respectively, fluid pressure generating means communicating selectively and directly with the ends of one only of said cylinder-piston assemblies, the head end of said one assembly being connected to the rod end of the other of said assemblies and the rod end of said one assembly being connected to the head end of said other assembly, and control means connected to said fluid pressure generating means for steering the wheels.

References Cited by the Examiner
UNITED STATES PATENTS

| 2,100,445 | 11/1937 | LeBleu _____ 60—52 |
| 2,646,291 | 7/1953 | Chambers et al. |
| 2,916,099 | 12/1959 | Bergmann et al. _____ 180—79.2 |
| 2,945,544 | 7/1960 | Jacobus _____ 180—79.2 |

FOREIGN PATENTS 1,251,296  12/1960  France.

BENJAMIN HERSH, *Primary Examiner.*

PHILIP ARNOLD, *Examiner.*